Patented Mar. 6, 1951

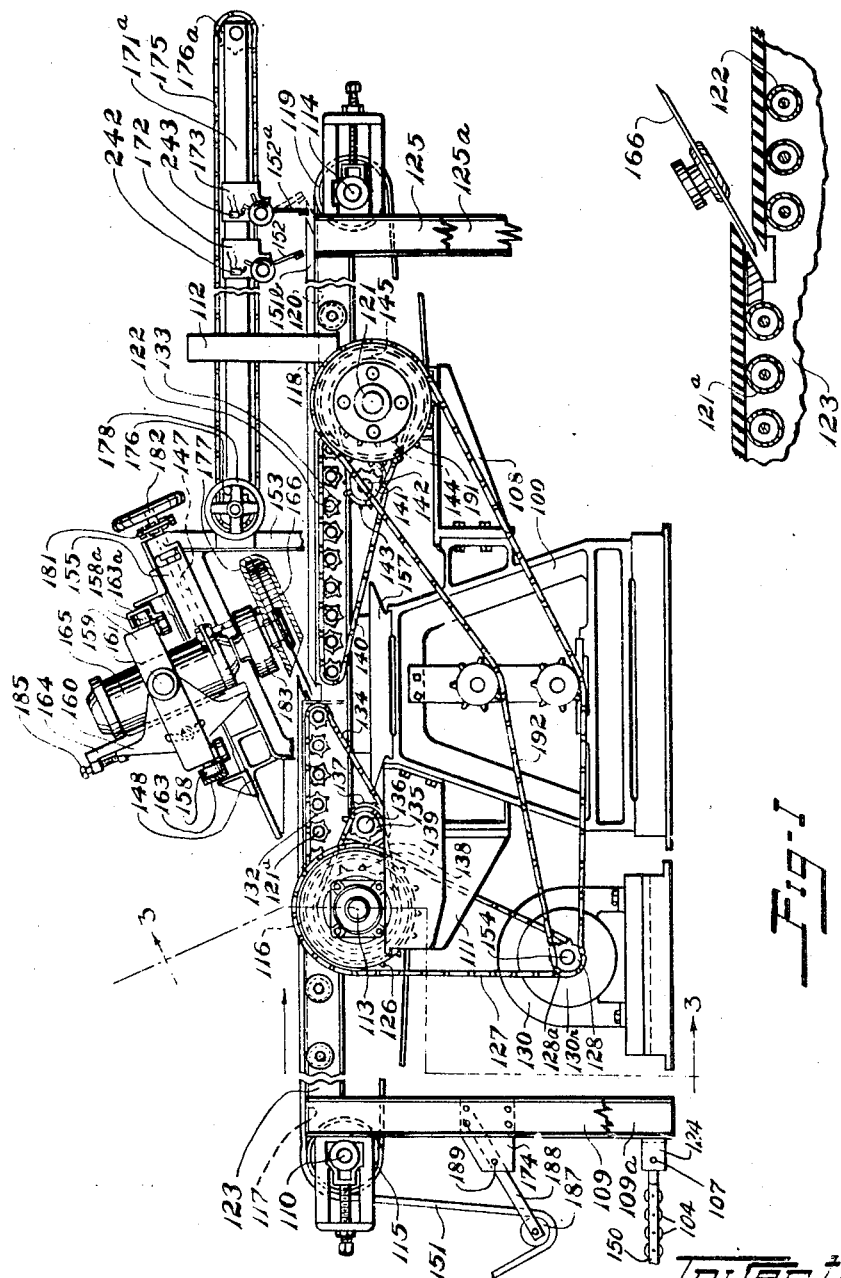

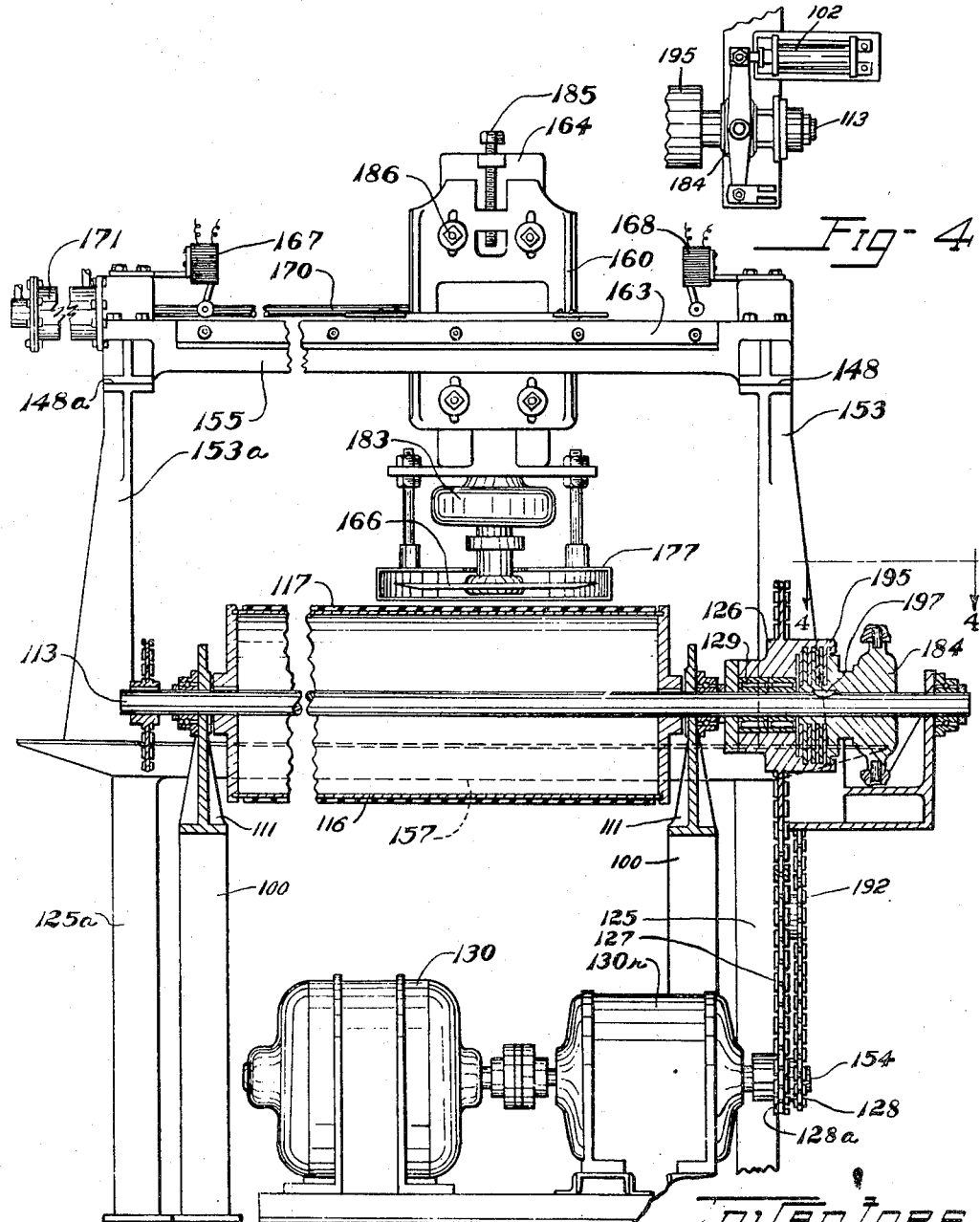

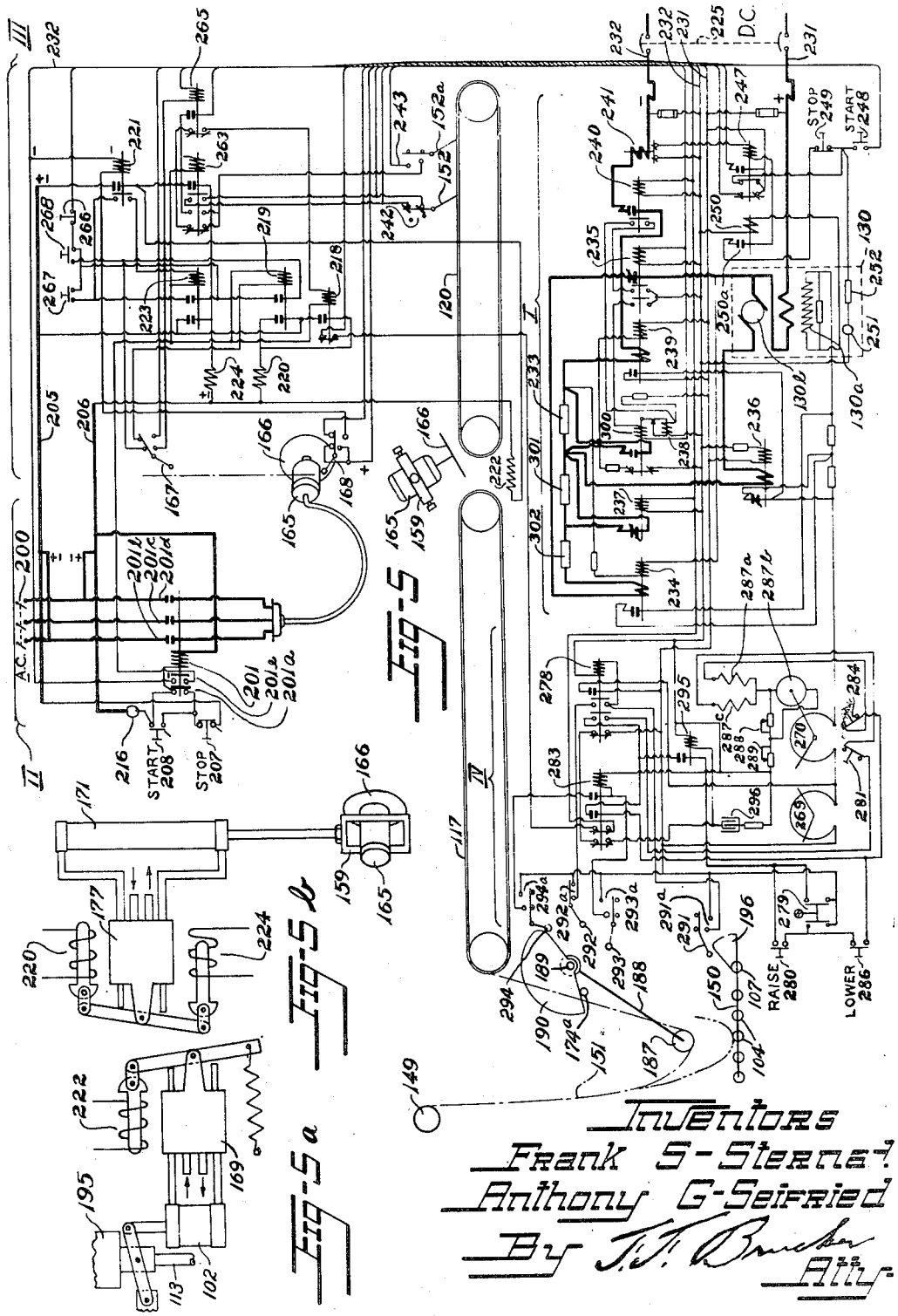

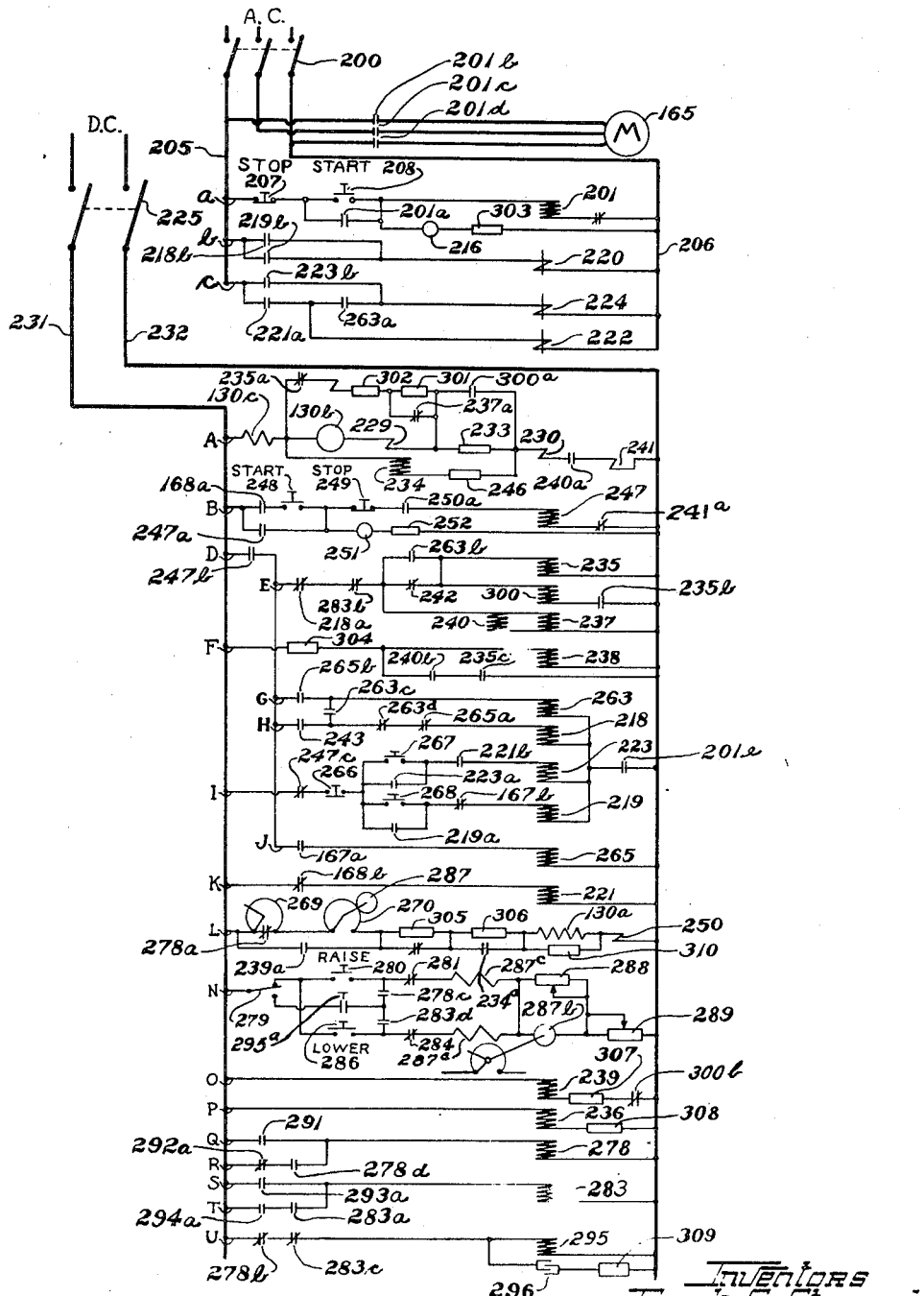

2,544,241

UNITED STATES PATENT OFFICE 2,544,241

APPARATUS FOR CUTTING MATERIAL

Frank S. Sternad, Cuyahoga Falls, and Anthony G. Seifried, Akron, Ohio, assignors to The B. F. Goodrich Company, New York, N. Y., a corporation of New York Application May 1, 1946, Serial No. 666,454

12 Claims. (Cl. 164—76)

This invention relates to apparatus for cutting flexible, hot extensible materials such as a continuous strip of extruded, unvulcanized rubber or other rubber-like composition that is fed from a source to be cut into uniform lengths, and it is particularly useful for cutting tire tread slabs.

In the apparatus heretofore proposed for cutting slabs from a continuous strip, difficulties have been experienced in cutting slabs of uniformly accurate volume because a precision stop of the strip could not be accomplished after the conveyor had measured off the length.

In the case of tread slabs for tires, unusual accuracy is desirable, as the tire assemblies must be given their final form, dimensions and finish by forming and curing them in metal molds on inflatable curing bags of very limited expansible possibilities. The volume of the tire carcass up to the stage of applying the tread slab has been very rigidly controlled and successful molding of the tire to bring out all of the intricate tread design, lettering and ornamentation engraved on the mold and the compacting and uniting of the many plies of sheet material constituting the tire structure depends upon assembling on the carefully proportioned carcass a tread slab of corresponding accurate volume. If the completed assembly falls short of the total volume required to fill the mold, it will, after curing, be unsightly in appearance, lack full adhesion along the plies of material in its structure, and will not be dependable. If the volume of the tread slab is excessive, there will be too much overflow when the mold closes, the materials of the tire structure will be displaced and distorted, and the excess overflow at the parting of the mold will be valueless cured scrap. To avoid such molding losses, as weight is a satisfactory index of volume, the tread slabs may be carefully weighed immediately after cutting and those under or over the tolerance of the specification may be returned for remilling and may be reprocessed through the extruder or the calender into tread strip. When such costly equipment as mills and calenders was so employed, their potential production possibilities and earning power are correspondingly curtailed, especially as a proportional part of the production may be rerun two or more times.

The present invention aims to provide for overcoming these difficulties by accurately controlling the volumetric content of such slabs.

Objects of the invention are to provide automatic control of the feeding, measuring, and cutting operations; to provide for cutting the strip material to accurate duplicate lengths; to provide for retarding the travel of the strip previous to stopping it and thereby preventing overrun; to provide for preventing interference of the feeding and cutting mechanism; to provide for separating successive lengths at a cut position; and to synchronize the operations of the apparatus with the delivery speed of the source of such strip material.

These and other objects will appear from the following description and the accompanying drawings.

Of the drawings:

Fig. 1 is a side elevation of apparatus constructed in accordance with and embodying the invention, a portion of the knife carriage rail support being broken away so as to disclose the knife motor carriage.

Fig. 2 is a sectional view taken longitudinally of the apparatus in a vertical plane including the longitudinal center-line of the tread strip showing the relation of the circular knife to the strip.

Fig. 3 is an enlarged sectional view taken on line 3—3 of Fig. 1.

Fig. 4 is a detail top view of the mechanism which opens and closes a friction clutch and disconnects a pulley from power supply for a certain interval in the apparatus cycle, viewed as indicated by the line 4—4 in Fig. 3.

Fig. 5 is a diagram showing the relations of the principal mechanical parts of the apparatus and the electrical mechanism that controls the same.

Fig. 5a shows, symbolically, the relations of the operating solenoid, and the valve and the compressed air operated cylinder of Fig. 4.

Fig. 5b, shows the relations of the operating solenoids, the control valve, and the fluid pressure operated mechanism that actuates the cutting mechanism.

Fig. 6 shows diagrammatically, the electrical scheme of the circuits of Fig. 5, unencumbered with mechanical details.

Generally, the apparatus of the invention comprises a table like structure supporting a series of conveyor belts upon which the tread strip is transported. The conveyor belts are spaced apart between the ends of the table to present the tread strip to the rotary knife therebetween for severing measured lengths from it. One of the spaced apart belts receives the tread strip and transports it to the other which measures the slab length and moves the slab away after it has been severed. At the cutting station between the belts, a motor driven circular knife movable transversely of the table, cuts a length of the strip between movements of the conveyors. Whereupon the slab conveyor starts into motion and moves the slab away from the cut. The knife returns to its normal position out of the path of the tread strip. The tread strip receiving conveyor then starts and advances the tread strip to the slab conveyor to measure off the next slab, the strip advancing until its leading edge engages a first detector. When such detector responds to the arrival of the edge it brings about, through suitable mechanism, a considerable reduction of the speed of the previously fast moving belts during which slow-down the momentum of the conveyor system, including that of the driving motor, is absorbed by brake means. The reduction of speed obviates the difficulty of the conveyor over-running by a variable amount the length measured off when the stop for the cut is to be made. Upon arrival of the leading edge at a second detector at a slow pre-determined speed, the second detector through suitable mechanism, brings the conveyor to a stop, resulting in a precision measurement.

Referring to the drawings, the numeral 123 designates a table-like frame, supported by legs 109, 109a, 125, 125a, on which the horizontal shafts 110 and 114 are adjustably and rotatably mounted in parallel relation. A frame 100 has brackets 108, and 111, secured thereto at one side of the machine and a similar pair of brackets at the side of the machine opposite thereto, which support, rotatably, other horizontal shafts 113 and 121, in parallel relation to the shafts 110, 114. Shafts 110, and 113, have pulleys 115 and 116 respectively fixed thereto for supporting and driving a conveyor belt 117 trained thereabout. Similarly shafts 121 and 114, have pulleys 118 and 119, fixed respectively thereto for supporting and driving a conveyor belt 120, trained thereabout.

Provision is made for supporting the strip material close to the cutter and between the pulleys 116, 118 while driving the strip at the same velocity as that of the conveyor belt. For this purpose, the belts 117 and 120 are spaced apart and separated by the conveyor roll trains 121a, and 122. The rolls of the roll trains have their shafts rotatably supported in the horizontal members of the table frame 123, as shown in Fig. 2, and each carries an affixed sprocket such as 132 and 133, about which drive chains 134 and 140 are respectively trained.

Shafts 136, 142 for driving these chains are rotatably supported, by brackets 111, 108 respectively, parallel to shafts 113, 121. Chains 134, 140 respectively engage the drive sprocket 135, fixed to shaft 136 and driving sprocket 141 fixed to shaft 142. A sprocket 137 is fixed to shaft 136 and a sprocket 143 is fixed to shaft 142. Sprocket 138 is fixed to the conveyor pulley shaft 113, and sprocket 144, is fixed to the conveyor drive shaft 121. Chains 139 and 145, are trained respectively about sprockets 138, 137 and sprockets 144, 143. Sprocket 126, is fixed to a loose clutch member 195, which is rotatably mounted on roller bearing 129, about shaft 113, see Fig. 3. The fixed member 184 of the clutch slides on shaft 113, and engages a driving key 197. Moving the clutch member 184 towards clutch member 195, causes the clutch to drive shaft 113 and with it the roller train 121a. The clutch, comprising members 184, 195, is a disk type, friction clutch. The mechanism for controlling said clutch is shown in Fig. 4, and will be described later. Sprocket chain 127, is trained about a sprocket 126, fixed to the loose clutch member 195, and sprocket 128a, fixed to shaft 154 of a motor driven gear unit 130r. Operating said clutch to drive shaft 113, sets in motion the pulley 116, which as shown is keyed to said shaft, and consequently drives the conveyor belt 117.

Belt pulley 118 is fixed to the shaft 121, which is fixed directly to a sprocket 191, which carries the drive chain 192, engaging a sprocket 128. Sprocket 128, is fixed to shaft 154, of the reducing gear unit 130r. Thus conveyor belt 120 is driven directly from the motor 130, to operate whenever said motor does. In the cycle of operations of the apparatus it is necessary for the conveyor belt 117, to remain at rest for an interval after conveyor belt 120, has started to take the severed slab 151b, away from the knife to separate the two fresh cut ends which are usually quite tacky and prone to stick together upon contact and cause difficulties in the return of the knife 166, across the conveyor. Upon the return of said knife to said station, said clutch is operated by control means to be described hereinafter to drive the belt 117, to advance the tread strip 151.

Some strip compositions become quite sticky and troublesome when heated by the rapidly rotating circular knife 166, mounted on the spindle of motor 165. A copious flow of liquid lubricant, such as water, must be maintained on said knife and the material to dissipate the heat. To provide free drainage for the large volume of fluid the two said belts are separated and the resulting gap spanned by the two roll trains 121a, and 122, power driven as previously described, on which the tread strip is carried across from belt 117, to belt 120. Such rolls are of noncorrosive material and so proportioned and so spaced that the leading end of the tread strip passes over them without bending sufficiently to enter said spacing, there is however ample space for the lubricant to fall through into the catch basin 157, provided to receive the liquid lubricant and conduct it to a pump (not shown) for reuse.

The circular knife 166 is driven by a motor 165 adjustably mounted in a carriage 159, which is supported by antifriction rollers 158, and 158a, traveling traverse rails 163, and 163a, on a movable frame 155. The carriage is secured to the piston rod 170 of a double-acting fluid pressure operated cylinder 171, and is moved thereby at the appropriate time to traverse the rails and apply the knife to the tread strip to make the cut and to return it to its normal position out of the path of the tread strip.

The knife 166 may become reduced in diameter by grinding it, and the supporting spindle of motor 165 may be adjusted to compensate for such change due to sharpening, by means provided therefor. Also it is desirable to change the angular position of the knife to accommodate the various tread slab specifications. To provide such adjustments, a cradle 160 is suspended on trunnions 161, at respective sides of said motor, said trunnions being journaled in the carriage frame 159, as indicated. A slideable base of the motor is movable in ways in the cradle. Said slide is adjustable vertically in such ways by the adjusting screw 185, mounted in lugs on the respective parts as shown. The slide 164 may be securely locked in place after such adjustment by bolts 186, which are movable in their slots in the cradle 160 for adjustment purposes. For adjusting the knife vertically, the rails 163 and 163a are on a subframe 155 of rectangular shape which bridges the conveyor and is mounted for vertical adjustment on the supports 153, 153a extending upwardly from the basin 157 supported by the table frame. Motor carriage 159 travels within the central opening of said frame. In Fig. 1, the near side of the frame is cut away to disclose the details of the knife motor carriage. The frame is slidably supported on the stands 153, and 153a, on rail faces 148, and 148a, as shown. The frame may be moved longitudinally of the machine along the rails by the two parallel adjusting screws 147. The screws are coupled to turn together by the sprocket chain 181, engaging sprockets fixed to the screws. Hand wheels 182, one on each screw are fixed to the screws for conveniently operating them to move the frame 155 longitudinally of the machine. A shield 177 encloses much of the knife 166 to confine the lubricant spray cast off by the said knife also to protect the operator from accident. Said shield is adjustably attached to the slide 164, by studs extending from the shield on said slide. A flywheel 183 of suitable dimensions is fixed to the motor spindle and stores energy to equalize momentary frictional drag and average the current demand of the said motor.

For controlling the length of tread strips cut from the strip material as it is advanced, limit switch actuators adapted to contact the leading end of the strip are adjustably mounted above the table frame.

For supporting the limit switches, a rail 171a extends along over the path of the tread strip and is supported by the bridge 112, extending over the conveyor and further supported by an extension of standard 153. The rail slidably supports the detector carriages 172 and 173, which carry the limit switches 242 and 243. Carriages 172, 173 may be moved along the said rail by the sprocket chain 175, carried on sprockets 176 and 176a rotatably secured to said rail. A handwheel 178 is fixed to the sprocket 176 for rotating it to drive the chain for moving the carriages 172 and 173 along the rail. A detector is very sensitively mounted on each carriage to detect the arrival of the leading end of the tread strip and actuate its respective switch. The switches 242, and 243 require little effort to operate them so that the thin skived advancing end of the tread strip is not appreciably deformed when it engages either of said detectors to operate the switches. Limit switches 167 and 168 are engaged by the actuators on the carriage 159, as part of the electrical control. Said switches operate interlocking electrical circuits to prevent operation of the conveyor except when the carriage 159 is clear of the slab.

The cross section of the tread strip gradually varies slightly over long stretches, hence length is not at all times a true index of the volume of the slab, for this reason the slabs 151b, are weighed immediately after removal from the conveyor 129, and the said detectors may be moved along the rail to compensate for over or under weights discovered tending to exceed the tolerance allowed. The means provided for effecting a precision stop of the conveyors insures that if the cross sectional area of the tread strip remains constant, the uniform lengths of the slabs obtained results in uniform volumetric content. The uniform weight of the slabs is an index that this result is being attained.

The tread strip is delivered continuously to the apparatus from the source over the delivery roll 149. The strip is allowed to form a storage loop of the strip 151, from which the conveyor 117, draws intermittently a slab length of strip for each cycle of the apparatus. Tread strip of small cross sectional area is delivered by the source at a higher speed than strip of large cross sectional area on account of the characteristics of the strip forming machines at the source.

This invention contemplates an arrangement of electrical means for controlling the conveyor motor 130 to adapt its speed to the speed at which the tread strip is received into the loop. Only the mechanical details of the speed control mechanism will be described here, to avoid repetition hereinafter in describing the operation of the electrical devices which affect the speed control.

A detector such as the floating roll 187 is controlled by the loop of the strip 151, to move up or down as the said loop decreases or increases. The roll is carried by an arm as 188, fixed to a rock shaft 189, which is movably supported by brackets 174 fastened to the frame members 109, 109a. The shaft 189 has a cam 190, fixed to it so that the movement of said detector roll, up and down, results in movement of the cam through a corresponding angle. Three limit switches 294, 292, and 293 are arranged with their actuating arms disposed in the path of said cam to be engaged successively and actuated to operate their contacts. The cam retains such of said switches as it engages, in the operating position until the loop grows larger and the detector roll follows to a lower position. The roll 187 follows the loop downward until the cam engages a stop 174a, on the bracket 174. The loop may continue on down until it rests upon the cradle comprising the free running rolls 104, rotatably mounted in a pivoted cradle 150. A rock shaft 107 is fixed to the cradle from and rotatably mounted in the brackets 124, attached to the leg 109. Shaft 107 has affixed thereto a cam 196, arranged to actuate a limit switch 291. Switch 291 is mounted on leg 109. The cradle comprising rolls 104 is arranged to receive and support the tread strip loop when the said loop has increased in length sufficiently to rest upon it. Weight of the loop causes the cam 195 to actuate switch 291.

Fig. 5 shows the detectors of the apparatus and the switches which they actuate, the solenoids controlled by such switches, the secondary switches operated by such solenoids, and the electrically powered mechanisms controlled by such secondary switches to function in the cycle of the apparatus. Only the principal electrical parts have numerals applied thereto in this figure to avoid crowding. Fig. 6 shows diagrammatically the schemes of the separate electrical circuits unencumbered by mechanical detail and facilitates tracing the conductors and comprehending the organization of the groups of devices shown in Fig. 5.

In the following description, "normally open" or "normally closed" designates the condition when the operating mechanism is in the returned position. Many of the devices have a spring operated return, their normal state is the returned position caused by such spring.

In Fig. 5, the electrical devices are grouped about the parts of the apparatus they pertain to; group I relates to starting, accelerating, working speed, slow-down, and dynamic brake stopping of the conveyor drive motor 130; group II relates to the starting and stopping of the knife motor 165; group III, relates to measuring off the length of the tread slab and the severing of it from the tread strip; group IV, relates to the automatic control of the speed of the conveyors to synchronize the cycles of the apparatus with the rate of delivery of the tread strip from the source. Conductors extend from one group to the other to connect interlocking switches to cause the various devices to function in their respective intervals in the operating cycle and to prevent their operation at inopportune times by the manual controls provided, resulting in damage to the product, the apparatus or an operator. The circuits are more readily followed by reference to Fig. 6.

The apparatus is put into operation by first closing the circuit breaker 200 to supply alternating current to the motor 165 and to the group II circuits a, b, and c, and then closing circuit breaker 225 to supply direct current to main lines 231, 232 and thereby to close normally open contactors in the group I branch circuits A, B, D, E, F, O, P, and L; group III branch circuits G, H, I, J and K; and group IV, branch circuits N, Q, R, S, T and U.

Upon closing circuit breaker 200, current is admitted to the power leads leading to motor 165 and also to the power leads 205, and 206. Closing the normally open "Start" push-button switch 208 in branch circuit a admits current to the circuit a, from 205, through normally closed stop switch 207, solenoid coil 201, to lead 206, the solenoid coil 201 closing contactor switch 201a to provide a holding circuit around switch 208 and also closing normally open contacts 201b, and 201c, and 201d to admit current to the knife motor 165, whereupon said motor is energized. Closing switch 208 also admits current through resistance 303 to energize signal lamp 216, indicating that said motor is running. Interlock switch 201e common to branch circuits G, H, and I and normally open, is closed by energizing of solenoid 201 to allow operation of devices in those circuits of group III controlling directly and indirectly mechanisms that should not operate unless knife motor 165 is running. Switch 201e remains closed as long as solenoid 201 in branch circuit a is energized due to the holding circuit provided around starting switch 208.

When direct current is admitted to power leads 231 and 232, by manually closing circuit breaker 225, current enters circuit L to energize the shunt field circuit 130a of the conveyor motor 130, energizing field failure relay 250, closing its contact 250a in circuit B to set that circuit for later energizing, and also directly energizes circuits F, K, O, and P energizing thereby solenoid 238 in circuit F, solenoid 221 in circuit K, solenoid 229 in circuit O, and solenoid 236 in circuit P.

The rheostats 269 and 270 in the shunt field circuit L of the motor 130 are next manually preset for the size of tread to be run. Such presetting is largely a matter of recorded experience from test runs and daily practice. As aforestated, tread strip of small cross sectional area requires higher conveyor speed than strip of large cross sectional area. The arm of manually operated rheostat 269 in circuit L is moved to the desired position, then a transfer switch 279 in circuit N is set for manual control for positioning the arm of rheostat 270, by operating either push-button switch 280, marked "Raise" or push-button switch 286, marked "Lower" in branch circuit N as the instance may require. The events which take place in circuit N upon the operation of said push-button switches will be fully described relative to the operation of group IV, devices hereinafter. Such presetting of said rheostats is required to approximately match the speed of conveyors 117, and 120, to the anticipated rate of delivery of the tread strip by the source. Air operated clutch 184, 195 is normally engaged at this time to transport the tread strip to the detectors 152, and 152a, for measuring, air clutch valve solenoid 222, in circuit c being deenergized.

"Start" push-button switch 248, in circuit B is then manually closed to set in operation the devices of group I, to start the conveyor driving motor 130. Closing said push button switch 248 admits current to solenoid 247 through switch contact 168a (now closed by the knife carriage being at the starting station at the extreme right as shown in Fig. 3 and contacting the switch 168 as shown in Fig. 5), normally closed "Stop" switch 249, normally closed switch 241a and field-loss relay switch 250a (now closed by its coil 250 in energized circuit L), the energizing of the solenoid 247 operating to close the switch 247a in the holding circuit about switch 248 via resistor 252 and lamp 251. This current energizes said lamp to indicate that the circuit B is energized. The energizing of solenoid 247b in circuit B also closes a contact switch 247 in circuit D, making possible the later energizing of circuits E, G, H, and J. Of these, only the branches of circuit E including solenoids 235, 237 and 240 are closed and energized immediately. The energizing of solenoid 247 also opens normally closed safety interlock switch 247c in circuit I, to prevent manually controlled operation of the knife carriage 159, while conveyor motor 130 is running.

Current in the branches of now closed circuit E including the solenoids 235, 237 and 240, energized by closing of switch 247b in circuit D, energizes the solenoid 235 in circuit E and also energizes solenoids 240 and 237. Energizing of solenoid 240 in circuit E closes contact switch 240a in circuit A to admit current to circuit A, thereby energizing the series field 130c and armature 130b of motor 130 through resistor 233 and dynamic braking and field accelerating relay 230. At the same time the energizing of solenoid 235 closes interlock switch 235c of circuit F, switch 240b having been closed in the same circuit by the energizing of solenoid 240 shunting solenoid 238 which, however, due to a time delay associated therewith, is not immediately deenergized. Energizing of coils 235 and 237 also opens normally closed switches 235a and 237a in circuit A, whereupon current flows via series field winding 130c, armature winding 130b, decelerating relay coil 229, resistor 233, series field dynamic-braking coil 230, switch 240a and overload relay coil 241, to lead 232, starting the motor 130 with limited current.

The now closed interlock switch 235b in circuit E, controlled by solenoid 235 of circuit E, energizes the solenoid 300 which controls switch 300a in circuit A. Simultaneously with the closing of switch 235b, interlock switches 235c, of circuit F has closed short circuiting the energized holding coil 238 in circuit F through resistor 304. Coils 238 and 300 have a common armature and oppose each other, coil 238 acting to open switch 300a in circuit A and being opposed by coil 300 tending to close it. Short circuiting of coil 238 after a time interval, due to slow decay of current in said short circuited coil brought about by inductance of circuit caused by a shield about coil 238, closes switch 300a in circuit A, short circuiting resistor 233 in circuit A, thereby increasing the current to the armature 130b of motor 130 and bringing the motor 130 to operating speed. Relay coil 237, in circuit E being energized as aforesaid, opens normally closed switch 237a in circuit A, pending later requirements. Current in circuit A, via resistor 246, energizes the shunt coil 234 in circuit A. Energizing of coil 234 closes a normally open switch 234a in circuit L shunting out a resistor 306 in that circuit. The motor 130 is now running at a higher speed as permitted by the rheostats and resistors in the motor circuits A and L.

The conveyors 117, 120, are now up to speed and ready to receive the tread strip 151. When the leading end arrives, the end is squared and passed over the delivery roll 149, and then lead under the floating detector roll 187, and up onto the moving conveyor belt 117, which after tractive contact is established draws on the loop of strip 151 for supply and passes said strip along to conveyor belt 120, over the intervening power driven roll trains 121a, and 122.

When the leading edge of the tread strip engages the detector 152, the means to absorb the momentum of the high speed conveyors and their driving mechanism is applied to prevent "over run." Practically instant stopping of the conveyors to obtain precision is therefore achieved. Such stopping means includes a detector 152 for detecting the arrival of the leading edge of the tread strip at a point sufficiently ahead of the desired stopping point to provide an ample interval for the motor 130, under applied limited dynamic braking to absorb excess momentum, and a second detector 152a located close to the desired stopping point, operable by the leading edge to cause application of final dynamic braking to stop the said conveyors, completing the measuring operation. Upon the leading end of the tread strip actuating detector 152, to open normally closed switch 242 in circuit E, whereby solenoids 235 and 300 are deenergized, thereby switch 235a of circuit A is closed and contact 300a of circuit A is opened, inserting the resistor 233 in series with the armature and closing a shunt circuit comprising resistors 301 and 302 around said armature, resulting in a considerable drop of potential at the armature terminals. The higher counter-voltage of the speeding armature causes a reverse current to flow through its winding and the local circuit set up by said shunt resulting in a dynamic brake effect slowing down the armature until its counter-voltage falls below the applied potential at its terminals when it continues to run at a corresponding reduced speed. During such slow-down the conveyors 117, and 120, tend to drive said armature until their momentum is absorbed in the aforedescribed dynamic braking effect. Such slow-down takes place in a very short interval of time determined by the proportions of the said resistors.

A normally closed interlock switch 300b in circuit O normally establishing current flow through solenoid 239, closes contact 239a in circuit L, shunting the field rheostats 269 and 270, increasing the current in the shunt field winding 130a, and intensifying the field of motor 130 to more promptly reduce its speed.

Upon the leading end of the tread strip engaging detector 152a, full dynamic braking is applied to slowly running motor 130 to produce a precision stop. The closing of normally open limit switch 243 in circuit H, by detector 152a, closes circuit H so that current is admitted to energize solenoid 218, through normally closed switch 263d, normally closed switch 265a, and closed interlock switch 201e. Solenoid 218 is of group III, and opens, when energized, the normally closed interlock switch 218a in circuit E, deenergizing contactor solenoids 240 and 237, 235 and 300 having previously been deenergized thereby cutting off the power supply to the armature 130b of motor 130 and short circuiting shunt resistor 301, leaving only the low value dynamic brake resistor 302 in the armature circuit and resulting in a prompt dynamic brake stop of the slowly revolving armature. Contactor solenoid 218 of circuit H also closes contact switch 218b of circuit b, admitting current from lead 205 through solenoid 220, to lead 206 actuating compressed air valve 169, to valve air to the air operated cylinder 171, which operates to cause the traverse of the knife motor carriage 159, across the conveyor to make the cut, severing the tread slab 151b from the tread strip 151. As the said carriage leaves the starting position, moving away from the limit switch 168, which is a double pole double throw switch having pairs of contacts 168a and 168B. (See Fig. 5.) In circuit band K, said switch is freed to resume its normal closed position opening contact 168a in circuit B, to no immediate effect, as circuit B is closed by the holding circuit through switch 247a thereabout. The release of limit switch 168 also closes contact 168b in circuit K, energizing solenoid 221 which closes contact switch 221a in circuit c, and contact switch 221b in circuit I. Circuit I at this time is inactive as contact switch 247c is open. Upon closing of contact switch 221a in circuit c, current is admitted to solenoid 222, of the solenoid operated valve 169, valving compressed air to operate cylinder 102 to open clutch 184, 195, disconnecting conveyor 117 from power as furnished by chain 127, and sprocket 126. The knife carriage moves on until it engages and actuates limit switch 167 (see Fig. 5) which is a double pole double throw switch having a pair of contactor 167a in circuit J, and also a pair of contactor 167b in circuit I. The closing of contactor 167a in circuit J energizes solenoid 265 in that circuit. The energizing of solenoid 265 causes opening of the normally closed interlock switch 265a in circuit H, deenergizing solenoid 218 in that circuit, thereby opening switch 218b in circuit b and deenergizing solenoid 220 of valve. The closing of the normally open contact 265b in circuit G by solenoid 265 energizes coil 263, in circuit G. This results in closing of the normally open switch 263a in circuit c and energizes solenoid 224 of valve, valving air to cylinder 171 to run said knife carriage in the reverse direction back to the starting position. Closing the normally open interlock contact 263b in circuit E as a result of the energizing of coil 263, and the closing of the normally closed interlock contactor switch 218a of circuit E by deenergizing of coil 218, energizes coil 235, 300, and 237, 240 to operate in the sequence previously described for these solenoids to start, accelerate and connect in running speed, the conveyor motor 130. As the clutch 184, 195 is open as previously stated, only conveyor 120 operates, taking the severed tread slab 151b away from the knife 166. The closing of the normally open interlock contact 263c between circuits G and H by energizing of coil 263, provides a sustaining circuit in circuit H about switch 265b for coil 263.

As the knife carriage 159 returns, leaving switch 167, switch 167 recovers its normal setting, opening contact 167a in circuit J and closing contact switch 167b in circuit I. Opening contact switch 167a in circuit J deenergizes coil 265, closing contact switch 265a in circuit H, and opening contact switch 265b in circuit G. When knife carriage 159 contacts limit switch 168 at the starting position it opens normally closed switch 168b of circuit K. Opening contact switch 168b of circuit K deenergizes contactor solenoid 221, opening contact switch 221b in circuit I (now inactive) and contact switch 221a in circuit C, deenergizing solenoid 224 of valve 177 to stop the knife carriage, also deenergizing solenoid 222 of valve 169, resulting in valving air to cylinder 102 to close clutch 184, 195, to again set conveyor 117 in motion, moving the leading edge of tread strip 151a toward the first detector 152, to repeat the aforedescribed cycle.

During the interval that conveyor 117 is halted and conveyor 120 is moving the severed tread slab 151b away from the knife 166, a separation of the two edges occurs permitting detectors 152, and 152a to recover their normal positions and their respective limit switches to reset. As switch 242 is reset in circuit E no effect results as the switch 263b in the holding circuit thereabout is still closed. As switch 243 in circuit H opens it deenergizes coil 263 which opens switch 263b in circuit E.

When the new leading edge of tread strip 151a, operates detector 152, the cycle repeats to measure and sever another tread slab.

Group IV comprises the devices which regulate the running speed of the conveyors to synchronize the cycles of the apparatus with the rate of delivery of the tread strip 151 from the source. The strip is delivered continuously over the roll 149, but at various speeds and is draped in a loop, as shown, from which it is drawn intermittently by conveyor 117. This loop is utilized to operate the detector mechanism actuating the switches which control the conveyor speed. A detector affected by the increase and decrease of the loop, such as the roll 187 floating on the tread strip, may control the group IV devices to control the conveyor speed. In this embodiment roll 187 is rotatably attached to an arm 188, which is affixed to the shaft 189. A cam 190, is also affixed to the shaft and is arranged to engage the actuating members of the switches 292a, 293a and 294a, in circuits R, S, T, respectively. A cradle 150 is arranged to support said loop when it becomes sufficiently large, as when the tread strip tends to over-run the conveyors and drops away from the roll 187, which is limited in its downward travel, and ultimately runs on the free running rolls 104 of the cradle 150. As the cradle is lowered by the weight of the loop it actuates switch 291 in circuit Q.

The said switches 291, 292a, 293a and 294a control the devices of group IV as follows. Upon starting the apparatus, the speed of the conveyor motor 130 is determined by the presetting of the rheostats 269 and 270 in circuit L. As previously outlined relative to starting the conveyor motor 130, the arm of the manually operated rheostat 269 is set by hand to short circuit an appropriate amount of its resistance element. Transfer switch 279 in circuit N is set for hand control, that is for operating the motor 287 of the motor driven rheostat 270 to position its arm by means of push-button switches 280 and 286. Either the "Raise" push-button switch 280, or the "Lower" push-button switch 286, is actuated to direct current in circuit N, via switch 280, normally closed limit switch 281, the "Raise" section 287c of the split series field winding of the rheostat operating motor 287, the armature winding 287b of said motor, resistor 289 to lead 232, or via switch 286, "Lower" limit switch 284, "Lower" section 287a of said series field winding, said armature winding 287b and resistor 289, to lead 232. The arm of the rheostat is accordingly moved to change the resistance of the rheostat to raise or lower the speed of the conveyor motor 130. After the tread strip is threaded under the roll 187, and started satisfactorily on conveyor 117, transfer switch 279 is set for automatic control whereupon current from lead 231 passes through timing relay 295a (when closed), contactor switch 278c (when closed), to the "Raise" section 287c of the split field winding of motor 287, or through contactor switches 283d, 284, when closed to the "Lower" section 287a of the field winding to cause motor 287 to move said rheostat arm of rheostat 270 as heretofore described. When the moving tread strip is threaded under roll 187, to conveyor 117, care is taken to obtain a loop of such size as to clear both the said roll and the cradle 150. With the rheostats properly preset, the tread strip may run through such loop for some time before the loop changes sufficiently to actuate either the cradle or the roll.

If the loop increases substantially, it will ride on the rolls of cradle 150, and cause the closing in circuit Q of switch 291, whereby current will be admitted to the solenoid 278, to open the normally closed contact switches 278a, 278b of circuits L and U respectively and closing the normally open contact switches 278c, 278d in circuits N and R respectively. The normally closed contact switch 292a and the now closed contact switch 278d in holding circuit R, will sustain said solenoid 278 energized. The now open contact 239a in circuit L inserts the resistance of the manual rheostat 269, in the conveyor motor shunt field circuit L. Contact switch 278c in circuit N (now closed) admits current to energize the "Raise" section 287c of the series field winding and armature of motor 287, to rotate the arm of rheostat 270, to increase the resistance of said conveyor motor shunt field circuit. Contact 278b of circuit U, now open, cuts off the current supply to solenoid 295, but the discharge of condenser 296 in parallel with it maintains the said contact closed for a predetermined short interval resulting in the motor 287 moving the said arm but a short distance before being deenergized by opening of said contact. Motor 287 is not again energized until contactor solenoid 278 in circuit Q is deenergized, contact switch 278b in circuit U closed, condenser 296 recharged, and said contactor coil 278 again energized by the said loop lifting off and again resting on the cradle, which movement can occur with each withdrawal of strip from the loop 151 by the conveyor 117, in the recurring cycles of the apparatus. If such successive operations of switch 291, do not bring about a sufficient reduction of the said loop for the satisfactory operation of the apparatus the arm of the manual rheostat 269, has been set for too low a resistance value, or the condenser timed relay 295 in circuit U is set to open after too short an interval. One of these devices should accordingly be readjusted.

As the said loop decreases in length it picks up the detector roll 187, and begins to rotate cam 190, which, presently, operates switch 294, closing contact switch 294a in circuit T, but as contact switch 283a in that circuit, is now open, nothing happens. Said cam advances and opens switch 292a, to open circuit R. As the cradle operated switch 291 is now open, coil 278 is deenergized. Contact 278a, in circuit L, which has been held open by coil 278, now closes, shunting the manually operated rheostat 269, thereby decreasing the resistance of the shunt field circuit of conveyor motor 130, thereby strengthening the field to slow down said motor so that it operates at the speed selected on the motor operated rheostat 270. If this slowing up of the said conveyor results in the said loop increasing sufficiently to operate the cradle actuated switch 291, the cycle just described for speeding up said conveyor repeats. However, the delivery rate of the tread strip from the source may slow down or delivery may cease completely, whereupon the said loop growing excessively small, the cam 190 will advance to close switch 293a in circuit S, energizing contactor coil 283, opening normally closed contact switches 283b and 283c in circuits E and U respectively, closing normally open contacts 283d in circuit N. Cam 190 also previously or subsequently, depending upon the cam shape and setting, closes switch 293a in circuit S. Opening normally closed contact switch 283b deenergizes contactor coils 235, 300, 237 and 240, in circuit E, cutting off the current supply to motor 130 armature, and applying full dynamic braking to same, stopping the conveyor 117 immediately. Opening the normally closed contact switch 283c in circuit U, cuts off current supply to relay coil 295, which however is maintained for an interval by the discharge of condenser 296, as heretofore described. The momentarily closed contact switch admits current through closed contact switch 283d in circuit N to the "lower" series field winding 287a of motor 287 to rotate the arm of rheostat 270 to decrease its resistance of the shunt field circuit of the motor 130 and thereby to decrease the speed of conveyor 117. This automatically makes a new "set up" for the motor 130 running at a lower speed when it starts again, should the said loop merely have decreased in size due to a slightly lower rate of delivery over roll 187. Switch 293a is a means of effecting emergency stops of the conveyor 117, to prevent damaging the tread strip 151 by stretching and reducing its cross sectional area. If not so protected, the strip may be stretched for long reaches which would have to be cut out and returned to the source for rerun, causing losses. Therefore, this apparatus to automatically effect the quick stoppage of the high speed conveyors 117 and 120, by application of dynamic braking to the conveyor driving motor 130, quickly absorbing the momentum of the conveyor mechanism, is most valuable as in the course of the days production there are many "make readys" for change of size and therefore many unpredictables in the complicated production line, occasioning emergency stops. As the said loop increases in size after such stops of said conveyor motor, the cam 190 recedes and releases switch 293a which, recovering its normal setting, opens circuit S, which however, does not immediately result in deenergizing contactor coil 283 as the same is sustained by holding circuit T which admits current through the now closed switch 294a. As the loop grows and cam 190 further recedes, switch 292 is released to close contact switch 292a of circuit R, but nothing happens as contact switch 278d of that circuit is now open. Said cam further recedes and switch 294 is released thereby opening contact switch 294a of circuit T, deenergizing contactor coil 283, allowing contact switches 283c of circuit U and 283b of circuit E to resume their normally closed position and contact switches 283d of circuit N and 283a of circuit T to resume their normally open position. Closing contact switch 283b in circuit E energizes contactor solenoids 235, 237 and 240 and 300 to operate in manner afore described to start, accelerate and bring up to normal speed motor 130. Deenergizing contactor coil 283, further restores all devices in group IV, to normal, ready to repeat such of the aforesaid operations as may again be initiated by said loop.

Circuit I, which is opened by energizing of contactor coil 247, as a safety measure when starting motor 130, as heretofore described, may be used for traversing the knife 166 across the conveyor to cut tread strip at will, as when a new leading end is to be trimmed, by stopping the conveyor with stop switch 249 in circuit B and then operating push-button switches 266, 267 and 268 in circuit I. Operating push-button switch 268, admits current to coil 219 from lead 231 via normally closed switch 247c, normally closed stop push-button switch 266, normally closed switch 167b, and contactor switch 201e, now closed because motor 165 is running, to lead 232. The cut traverse can not be made unless knife motor 165 is running because of the contactor switch interlock 201e, thereby protecting the knife 166. When coil 219 is thus energized it operates its contacts, one of which 219a in the holding circuit about switch 268 by closing, serves to maintain said coil energized. Another contact 219b in circuit b at the same time admits current to solenoid 220, operating valve 177, to valve compressed air to cylinder 171, which operates to move the knife carriage 159 from the "start" position across the conveyor to make the desired cut. Upon the knife carriage engaging switch 167, normally closed switch contact 167b in circuit I is opened, deenergizing coil 219, allowing contact switch 219b in circuit b and contact switch 219a of circuits I, to open, whereupon valve 177 cuts air supply to cylinder 171, stopping the said knife carriage. When switch 167 is released by the departure of said knife carriage, its contact 168b in circuit K assumes its normally closed position admitting current from 231 via coil to 221 to lead 232, thereby closing contactor switches 221a in circuit c and 221b in circuit I, to lead 232. When the conveyors are not running, admitting current to solenoid 222 of clutch valve 169, operates the clutch to no effect. Closing contact 221b in circuit I prepares same for the energization of coil 223. Operating push-button switch 267 serves to return the carriage to the starting position. For this purpose current from 231 is admitted to coil 223 via closed switch 247c, normally closed switch 266, switch 267, closed switch 221b, and contactor switch 201e, to lead 232, energizing contactor coil 223, to close its contacts 223b and 223a in circuits c and I respectively. In circuit c, closing contact 223b admits current to solenoid 224 energizing said solenoid to operate valve 177, to valve compressed air to cylinder 171, thereby causing return of said carriage to the "Start" position. When said carriage is moved away to return, switch 167 resumes its normal position opening contact 167a in circuit J, and closing contact 167b in circuit I. Opening contact 167a in circuit J deenergizes contactor coil 265 to restore its controlled contacts to normal which produces no effect if motor 130 is not running. Closing contact 167b in circuit I restores the circuit to operative condition.

The knife motor carriage makes the complete traverse from one side of the conveyor to the other unless stopped along the way by operation of manually operated switch 266, of circuit I which deenergizes both contactor coils 223 and 219, opening contacts 219b in circuit b and 223b in circuit c, deenergizing solenoids 220 and 224 of valve 177, allowing said valve to assume its neutral position cutting off air to cylinder 171, stopping knife carriage 159 where desired. Said carriage can be again set in motion in either direction by operating the appropriate push-button switch 268 or 267 in circuit I, initiating the desired travel as heretofore described.

While the operation of the apparatus has been thoroughly discussed in connection with its construction, the general operation of the same may be stated as follows: A strip of rubber-like material delivered by a suitable source is draped in a storage loop between the terminal of a supply conveyor or a delivery roll as 149, and the end of the receiving conveyor 117 of the apparatus. Conveyor 117, operates intermittently to draw upon said loop for lengths of strip, imparting to the loop a corresponding reciprocating fluctuation in length. If the source delivers said strip at a speed exceeding the average take of said conveyor, said loop will tend to increase in length. If said delivery speed falls short of the average take of said conveyor, said loop will tend to decrease in length. To restrict such changes in loop length, detectors are provided to gage such variations and cause changes in the speed of said conveyor to adjust the amount of its average take to suit said source-delivery, and hold such variations in loop length within predetermined limits.

Upon the loop increasing in length sufficiently to weigh down the cradle 150, to operate switch 291, electrically motivated devices operate to increase the speed of the conveyor driving motor 130, by a small increment, if such increase in speed be adequate, said loop tends to increase in length. If such increment is not adequate the reciprocating loop again engages said cradle to operate switch 291, to increase said motor speed by another such increment, repeating, until said motor speed is sufficient to the purpose.

If the said loop tends to decrease in size more than required, the loop eventually operates roll 187 and cam 190, to actuate in proper succession switches 294, 292 and 293. Switch 294 operates only to start the motor if the motor is stopped and when the motor is running produces no effect. Switch 292 when actuated operates devices to reduce said motor speed by an amount determined by the preset given the arm of the manually operated rheostat 269. If such change is adequate said loop increases in length until again sufficiently long to cause operation of switch 291. Should the source-delivery speed abruptly slow down or cease completely, and said loop becomes excessively small, switch 293 is actuated to cause devices to apply dynamic braking to the conveyor motor to cause it to absorb the momentum of the conveyor mechanism and promptly stop it to prevent stretching and damaging the strip. Should the source-delivery speed of said strip continue slow, or delivery resume if stopped, roll 187 follows down in the lengthening loop causing cam 190 to recede and release said switches in succession with no effect on said motor until lastly, switch 294 returns to normal whereupon its associated devices apply power to said motor to restart, accelerate and attain an operating speed. When switch 293 is operated in this manner, it operates means to decrease the speed of conveyor by a small decrement.

As the conveyor 117 draws strip from said loop the conveyor passes it along to conveyor 120 which advances the leading edge of the strip to engage the detector 152 which, responding to contact with it, operates electrically motivated means to apply a predetermined degree of dynamic braking to the convey motor 130, and thereby cause it to slow down and absorb the major part of the momentum of the conveyor mechanism. The degree of such braking applied to the conveyor motor is such that, as the leading edge advances slowly to the second or stop detector, the response of such detector to engagement therewith results in cutting of the power supply and applying of full dynamic braking to the motor, causing it to quickly absorb the remaining momentum of the conveyor mechanism, effecting precise stop of said edge, completing the measurement of a length of said strip.

Immediately following such conveyor stop, the rotary knife 166 moves across the conveyor and severs the measured length from said strip. Directly said knife completes such movement, the conveyor 120 starts in motion to take the cut length away from the knife and cause a separation of the length from the strip. The knife immediately returns to its "start" position out of the path of the strip. Conveyor 117 then starts up to pass the strip along again to conveyor 120 until the new leading edge contacts the detector 152 to repeat the cycle.

The cut lengths are removed from the conveyor 120 as it delivers them for checkweighing, if such lengths tend to vary in weight beyond a specified tolerance, the attendant moves said detectors to shorten or lengthen said lengths of strip a sufficient amount to bring the following ones inside such tolerance. The advantage of this invention over apparatus heretofore used is that it measures and cuts the strip to precise lengths due to lack of overrun of the conveyor, any variation in weight that has to be compensated for is due to variation in cross sectional area, affecting the volume of the strip, such variations of cross section of the strip are gradual over long lengths of the material so that while constant viligance is necessary for discovering them, only infrequent resetting of the detectors is required.

Variations may be made without departing from the scope of the invention as it is defined by the following claims.

We claim:

1. Apparatus for measuring and cutting lengths from a continuous strip of material, said apparatus comprising conveyor means for advancing the strip material, means for driving said conveyor means, means in the path of the strip for reducing the speed of advance of said conveyor means when the leading end of the strip has advanced a predetermined amount short of the desired strip length, means for arresting all advance of the conveyor means from said reduced speed when the leading end of the strip has advanced a determinate distance, and means for cutting a length from the strip while the strip is supported upon the arrested conveyor means.

2. Apparatus for measuring and cutting lengths from a continuous strip of material, said apparatus comprising conveyor means for advancing the strip material, means for driving said conveyor means, a detector in the path of said strip and adapted to be actuated by contact with the leading end of the strip material, means associated with said detector for reducing the speed of advance of said conveyor means upon contact of the leading end of the strip with said detector, a second detector in the path of advance of said strip at reduced speed, means associated with said second detector to arrest all advance of said conveyor means from said reduced speed upon contact of the leading end of the strip with said second detector, and means for cutting a length from the strip while the strip is supported upon the arrested conveyor means.

3. Apparatus for measuring and cutting lengths from a continuous strip of material, said apparatus comprising a conveyor for advancing strip material, means for driving said conveyor, means for delivering a continuous strip of material to said conveyor, means in the path of said strip between said delivery means and said conveyor for regulating the speed of said conveyor to synchronize it with said delivery means, means in the path of said conveyor for reducing the speed of advance of said conveyor when the leading end of said strip has advanced a predetermined amount short of the desired length, means for arresting all advance of the conveyor from said reduced speed when the leading end of the strip has advanced a desired distance, and means for cutting a length from the strip while the strip is supported upon the arrested conveyor means.

4. Apparatus for measuring and cutting lengths from a continuous strip of material, said apparatus comprising a conveyor for advancing a strip of material, means for driving said conveyor, means for delivering a continuous strip of material to said conveyor, means in the path of said strip between said delivery means and said conveyor for regulating the speed of said conveyor to synchronize it with said delivery means, a detector in the path of said strip adapted to be actuated by contact with the leading end of said strip, means associated with said detector for reducing the speed of advance of said conveyor upon contact of the leading end of the strip with said detector, a second detector in the path of advance of said strip at reduced speed, means associated with said second detector to arrest all advance of said conveyor upon contact of the leading end of the strip with said second detector, and means for cutting a length from the strip while the strip is supported upon the arrested conveyor means.

5. Apparatus for measuring and cutting lengths from a continuous strip of material, said apparatus comprising conveyor means for advancing the strip material, means for driving said conveyor means, means in the path of the strip for reducing the speed of advance of the conveyor means when the leading end of the strip has advanced a predetermined amount short of the desired strip length, means for arresting all advance of the conveyor means from said reduced speed when the leading end of the strip has advanced a desired distance, a rotary cutter for cutting a length from the arrested strip, means for rotating said cutter, means for advancing said cutter across the arrested strip material to sever a length therefrom, and means for returning said cutter to its original position.

6. Apparatus for measuring and cutting lengths from a continuous strip of material, said apparatus comprising conveyor means for advancing the strip material, means for driving said conveyor means, means in the path of the strip for reducing the speed of advance of the conveyor means when the leading end of the strip has advanced a predetermined amount short of the desired strip length, means for arresting all advance of the conveyor means from said reduced speed when the leading end of the strip has advanced a desired distance, a rotary cutter for cutting a length from the arrested strip, means for rotating said cutter, means for advancing said cutter across the arrested strip material to sever a length therefrom, means for returning said cutter to its original position, and means for preventing operation of the conveyor means during advance and return of said cutter.

7. Apparatus for measuring and cutting lengths from a continuous strip of material, said apparatus comprising conveyor means for advancing the strip material, means for driving said conveyor means, means in the path of the strip for reducing the speed of advance of the strip when the leading end of the strip has advanced a predetermined amount short of the desired strip length, means for arresting all advance of the strip from said reduced speed when the leading end of the strip has advanced a desired distance, a rotary cutter for cutting a length from the arrested strip, means for rotating said cutter, means for advancing said cutter across the arrested strip material to sever a length therefrom, means for returning said cutter to its original position, and means for preventing advance of said conveyor while said cutter is in non-rotating condition.

8. Apparatus for measuring and cutting lengths from a continuous strip of material, said apparatus comprising conveyor means for advancing the strip material, means for driving said conveyor means, means in the path of the strip for reducing the speed of advance of the strip when the leading end of the strip has advanced a predetermined amount short of the desired strip length, means for arresting all advance of the strip from said reduced speed when the leading end of the strip has advanced a desired distance, a rotary cutter for cutting a length from the arrested strip, means for rotating said cutter, means for advancing said cutter across the arrested strip material to sever a length therefrom, means for returning said cutter to its original position, and means for preventing advance of said cutter across the path of said strip while said conveyor means is in motion.

9. Apparatus for measuring and cutting lengths from a continuous strip of material, said apparatus comprising a delivery conveyor for advancing the strip material, a receiving conveyor in alignment therewith for receiving cut sections of the strip, means for driving said conveyors, means in the path of the strip for reducing the speed of advance of the conveyors when the leading end of the strip has advanced a predetermined amount short of the desired strip length, means for arresting all advance of the conveyors from said reduced speed when the leading end of the strip has advanced a desired distance, means located between said conveyors for cutting a length from the strip while the strip is supported upon the arrested conveyor means, and means for starting advance of said conveyors when said cut has been completed.

10. Apparatus for measuring and cutting lengths from a continuous strip of material, said apparatus comprising a delivery conveyor for advancing the strip material, a receiving conveyor in alignment therewith for receiving cut sections of the strip, means for driving said conveyors, means in the path of the strip for reducing the speed of advance of the conveyors when the leading end of the strip has advanced a predetermined amount short of the desired strip length, means for arresting all advance of the conveyors from said reduced speed when the leading end of the strip has advanced a desired distance, means located between said conveyors for cutting a length from the arrested strip, means for starting advance of said conveyors when said cut has been completed, said last named means including means for delaying the start of the delivery conveyor beyond the start of the receiving conveyor to separate the strip at the cut.

11. Apparatus for measuring and cutting lengths from a continuous strip of material, said apparatus comprising a delivery conveyor for advancing the strip material, a receiving conveyor in alignment therewith for receiving cut sections of the strip, means for driving said conveyors, means in the path of the strip for reducing the speed of advance of the conveyors when the leading end of the strip has advanced a predetermined amount short of the desired strip length, means for arresting all advance of the conveyors from said reduced speed when the leading end of the strip has advanced a desired distance, means located between said conveyors for cutting a length from the arrested strip, means for starting advance of said conveyors when said cut has been completed, said last named means including means for starting said receiving conveyor in advance of starting said delivery conveyor.

12. Apparatus for measuring and cutting lengths from a continuous strip of material, said apparatus comprising a delivery conveyor for advancing the strip material, a receiving conveyor in alignment therewith for receiving cut sections of the strip, means for driving said conveyors, means in the path of the strip for reducing the speed of advance of the conveyors when the leading end of the strip has advanced a predetermined amount short of the desired strip length, means for arresting all advance of the conveyors from said reduced speed when the leading end of the strip has advanced a desired distance, means located between said conveyors for cutting a length from the arrested strip, means for starting advance of said conveyors when said cut has been completed, said cutting means comprising a rotary cutter adapted to be advanced and returned across the path of the strip, and said means for starting advance of said conveyor being motivated by return of said cutter to starting position.

FRANK S. STERNAD.
ANTHONY G. SEIFRIED.

REFERENCES CITED

The following references are of record in the file of this patent:

UNITED STATES PATENTS

| Number | Name | Date |
|---|---|---|
| 1,435,979 | Reed | Nov. 1, 1922 |